(12) United States Patent
Bird et al.

(10) Patent No.: US 8,403,123 B2
(45) Date of Patent: Mar. 26, 2013

(54) MAGNETICALLY ACTUATED ONE-WAY CLUTCH

(75) Inventors: Norman J. Bird, Plymouth, MI (US);
Gregory D. Gardner, Livonia, MI (US);
David A. Janson, Plymouth, MI (US);
Matthew T. Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 12/786,583

(22) Filed: May 25, 2010

(65) Prior Publication Data

US 2011/0290608 A1   Dec. 1, 2011

(51) Int. Cl.
| F16D 27/01 | (2006.01) |
| F16D 27/102 | (2006.01) |
| F16D 63/00 | (2006.01) |
| H02K 7/10 | (2006.01) |

(52) U.S. Cl. ..... 192/84.31; 192/84.8; 192/90; 188/82.3; 188/82.77; 310/77

(58) Field of Classification Search ............... 192/84.31, 192/84.8, 90; 188/82.3, 82.77; 310/77
See application file for complete search history.

(56) References Cited

U.S. PATENT DOCUMENTS

| 3,463,280 | A | 8/1969 | Hoffman et al. |
| 5,931,271 | A | 8/1999 | Haka |
| 5,996,758 | A | 12/1999 | Baxter, Jr. |
| 6,121,705 | A | 9/2000 | Hoong |
| 6,244,965 | B1 | 6/2001 | Klecker et al. |
| 6,814,200 | B2 * | 11/2004 | Stefina ........................ 192/43.1 |
| 6,854,577 | B2 | 2/2005 | Ruth |
| 7,258,214 | B2 | 8/2007 | Pawley et al. |
| 7,484,605 | B2 | 2/2009 | Pawley et al. |
| 7,610,892 | B2 * | 11/2009 | Butcher et al. ............. 123/179.3 |
| 8,006,819 | B2 * | 8/2011 | Dell et al. .................. 192/84.31 |
| 2004/0050641 | A1 * | 3/2004 | Jin ............................... 192/84.3 |
| 2011/0233026 | A1 * | 9/2011 | Pawley ........................ 192/41 S |

\* cited by examiner

*Primary Examiner* — David D Le
*Assistant Examiner* — Jacob S Scott
(74) *Attorney, Agent, or Firm* — James Dottavio; MacMillan, Sobanski & Todd, LLC

(57) ABSTRACT

A one-way clutch includes a first race secured against rotation and fitted with a coil, a second race supported for rotation, a coil carried by one of the races, and struts supported by one of the races, each strut driveably connecting and disconnecting the races in response to a magnetic field induced by current in the coil.

14 Claims, 10 Drawing Sheets

MAGNETICALLY ACTUATED ONE-WAY CLUTCH

BACKGROUND OF THE INVENTION

1. Field of the Invention

This invention relates generally to magnetically-actuated one-way clutch, and, more particularly to a motor-generator that employs a magnetically actuated one-way clutch especially for use in a hybrid electric vehicle.

2. Description of the Prior Art

The powertrain of a hybrid electric vehicle (HEV) includes an electric motor-generator. This generator is used to start the vehicle when in electric motor mode and when in generator mode the electric generator produces ac electric current, which is converted to dc and stored in an electric storage battery.

Under certain vehicle operating conditions, the motor is used to drive the vehicle wheels. In other operating conditions the electric generator produces ac electric current, which is converted to dc and stored in an electric storage battery.

The generator's rotor exhibits unwanted rotation in some modes of operation. The rotor must be stopped from rotating in some modes of operation and must be allowed to rotate in either direction in other modes of operation.

An actuator may include a member located between the locking elements of a one-way clutch (OWC) and the cams that are engaged by the locking members, thereby preventing engagement of the clutch, in one state of the actuator. When the actuator changes state, the member can move out of the way, thereby allowing the clutch to engage or lockup. An actuator of this kind requires many components and redundant actuation forces in addition to a spring force to ensure its reliability. Care must be exercised to ensure that the actuator member is much softer than the locking elements and the races of the one-way clutch. Otherwise, the control elements will wear prematurely before expiration of an acceptable service life.

A need exists in the industry for a simpler, more reliable and less costly technique for controlling generator rotation. Preferably the technique would avoid need for linkages in the OWC. Preferably the device would be direct acting and avoid need for an electric solenoid to control the OWC actuator.

SUMMARY OF THE INVENTION

A one-way clutch includes a first race secured against rotation and fitted with a coil, a second race supported for rotation, a coil carried by one of the races, and struts supported by one of the races, each strut driveably connecting and disconnecting the races in response to a magnetic field induced by current in the coil.

The one-way clutch provides a simple, reliable, low-cost selectable technique for controlling rotation of the rotor of a motor-generator. The clutch can be used in multiple applications where a magnetic field can be turned on and off in order to control the presence and absence of a drive connection between inner and outer races of the clutch.

The clutch avoids need for clutch linkages and an electric solenoid to control an actuator of the one-way clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
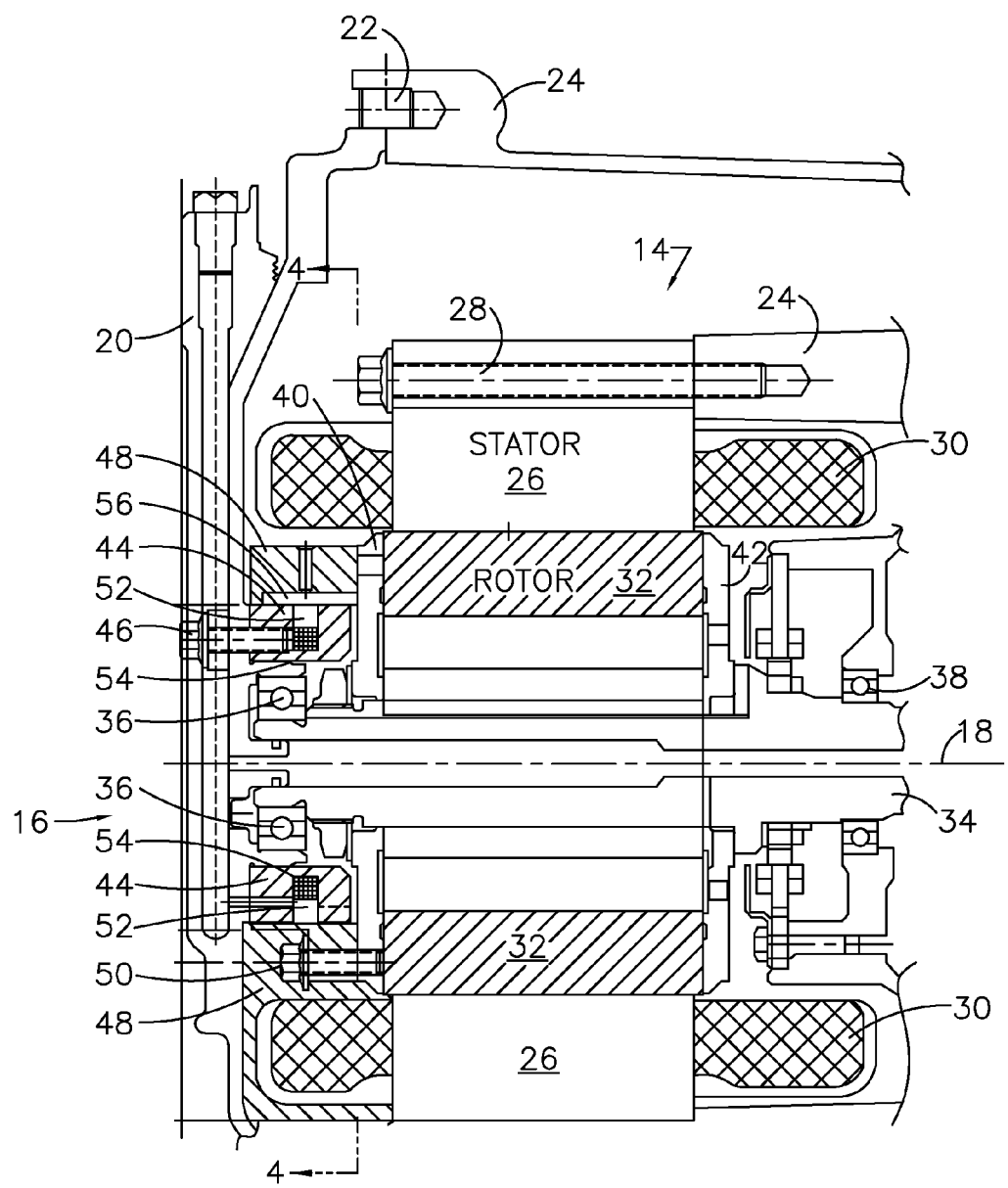
FIG. 1 is a cross section of a motor generator that includes a one-way clutch.
Figure 2:
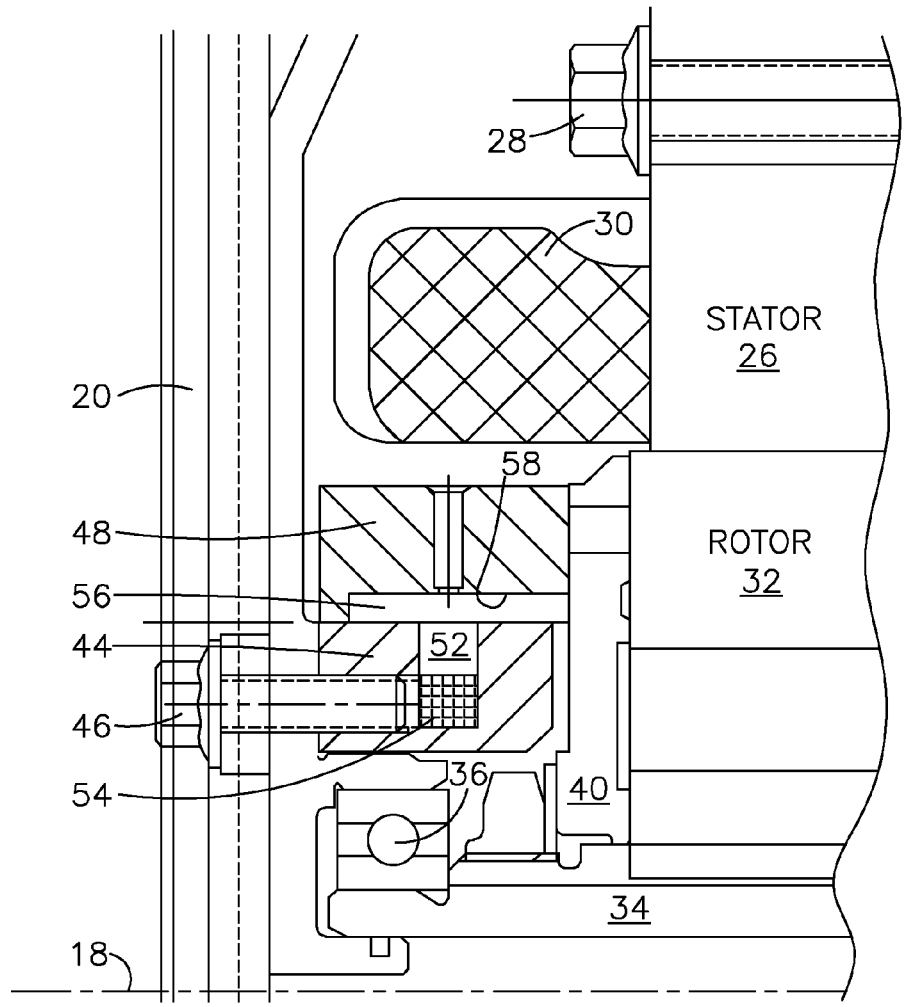
FIG. 2 is a cross section of the motor-generator and one-way clutch above the centerline to a larger scale than that of FIG. 1.
Figure 3:
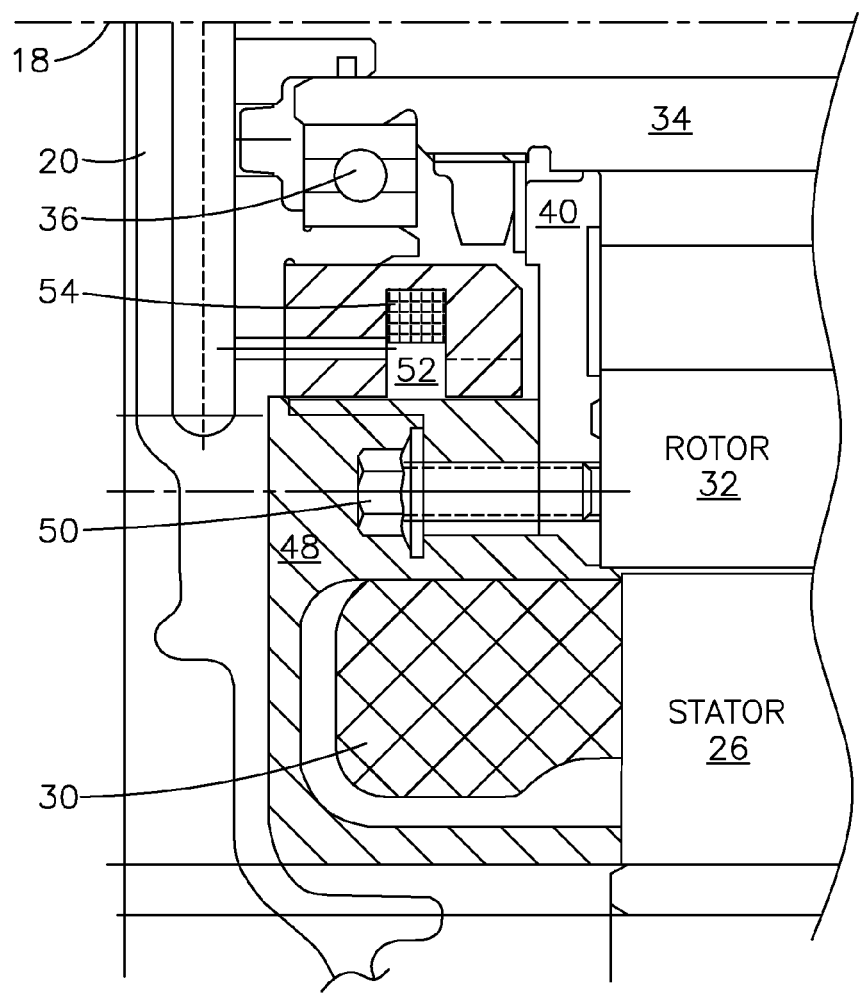
FIG. 3 is a cross section of the motor-generator and one-way clutch below the centerline to a larger scale than that of FIG. 1.

Referring now to the drawings, FIG. 1 shows a motor-generator 14 and one-way clutch 16 arranged about a central axis 18 and located within a space bounded by a front housing cover 20 secured by bolts 22 and to a housing 24, whose position is fixed.

The motor-generator 14 includes a stator 26, secured by a series of bolts 28 to an extension of the housing 24 or another fixed member; electrically conductive wire wound in a coil 30 about axis 18; a rotor 32 surrounded by the stator; and a rotor shaft 34 supported for rotation about axis 18 on bearings 36, 38. Each axial end of the rotor 32 is covered by an end cap 40, 42.

The one-way clutch 16 includes a cam plate or inner race 44, secured by a series of bolts 46 to housing cover 20; a pocket plate or outer race 48, secured by a series of bolts 50 to rotor 32; and struts or locking elements 56. The inner race 44 is formed with an annular groove 52 located mid-way between its axial ends. A toroidal coil 54 of electrically conductive wire is located in groove 52.

Figure 4:
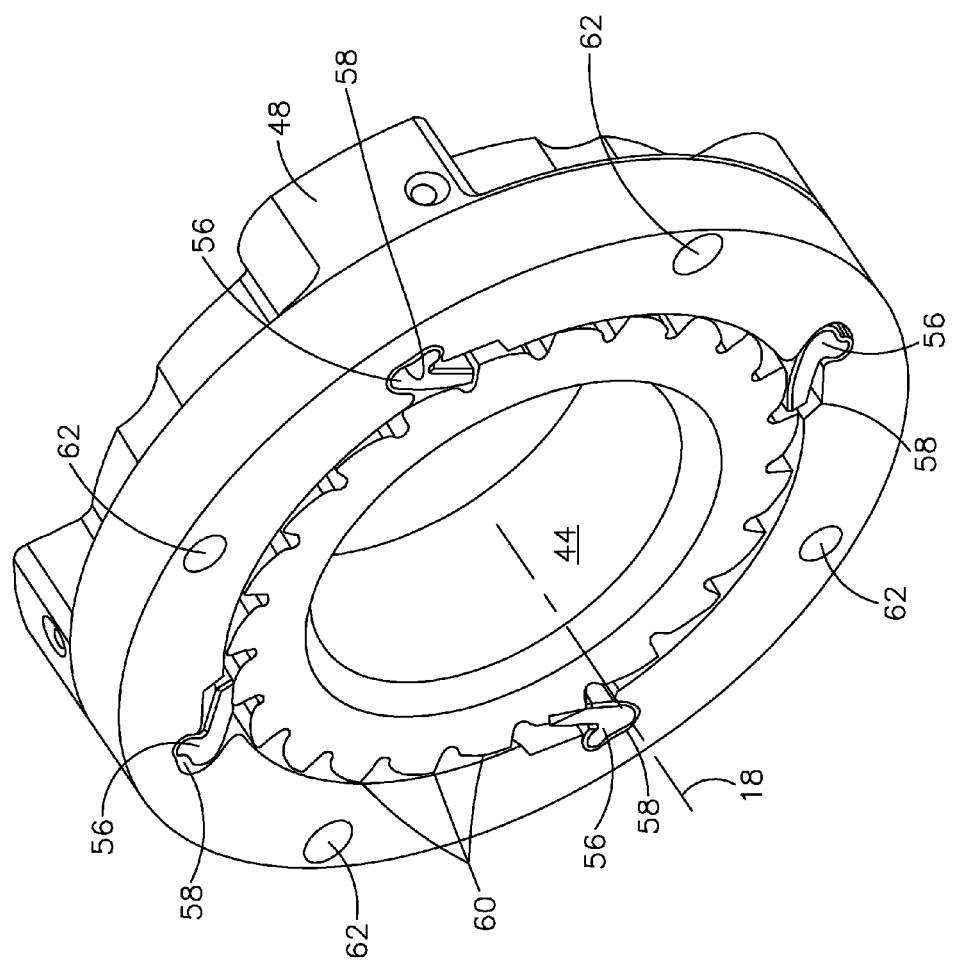
FIG. 4 is a perspective end view taken at plane 4-4 of FIG. 1.

FIG. 4 shows four struts 56 spaced angularly about axis 18, each strut supported in a pockets 58 formed in the outer race 48. The radial outer surface of the inner race 44 is formed with cams 60 spaced angularly about axis 18. The outer race 48 is formed with four holes 62, by which the outer race is connected by bolts 50 to the rotor 32. When the struts 56 pivot in the pockets 58 toward the inner race 44, the outer race 48 rotates clockwise relative to the inner race 44, and at least one strut engages a cam 60, clutch 16 produces a drive connection between the races, thereby locking the clutch and preventing the rotor 32 from rotating relative to the stator 26 and housing 20. When the outer race 48 rotates counterclockwise relative to the inner race 44, each strut 56 ratchets on the cams 60, the clutch 16 is unlocked or disengaged, and no drive connection between the races is produced.

Figure 5:
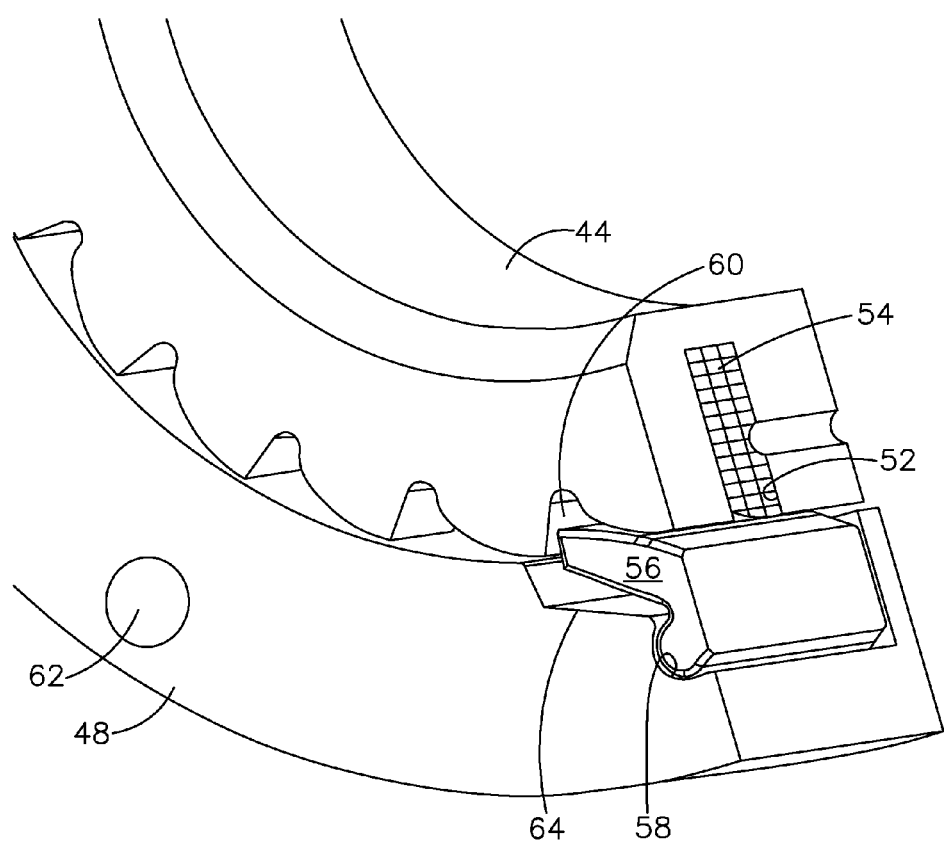
FIG. 5 is a perspective end view showing a locking element engaged with a cam.

FIG. 5 shows a strut 56 engaged with a cam 60. The coil groove 52 contains the coil 54. When coil 54 is energized, the magnetic field produced by current in coil 54 forces the strut 56 toward the cams 60. But when the outer race is rotating, centrifugal force urges the strut 56 radially outward away from the cams 60. A permanent magnet 64, preferably secured by a press fit to a surface of each pocket 58, urges each strut 56 away from the cams 60. The axial length of each strut 56 is sufficient to span the width of the coil groove 52.

Figure 6:
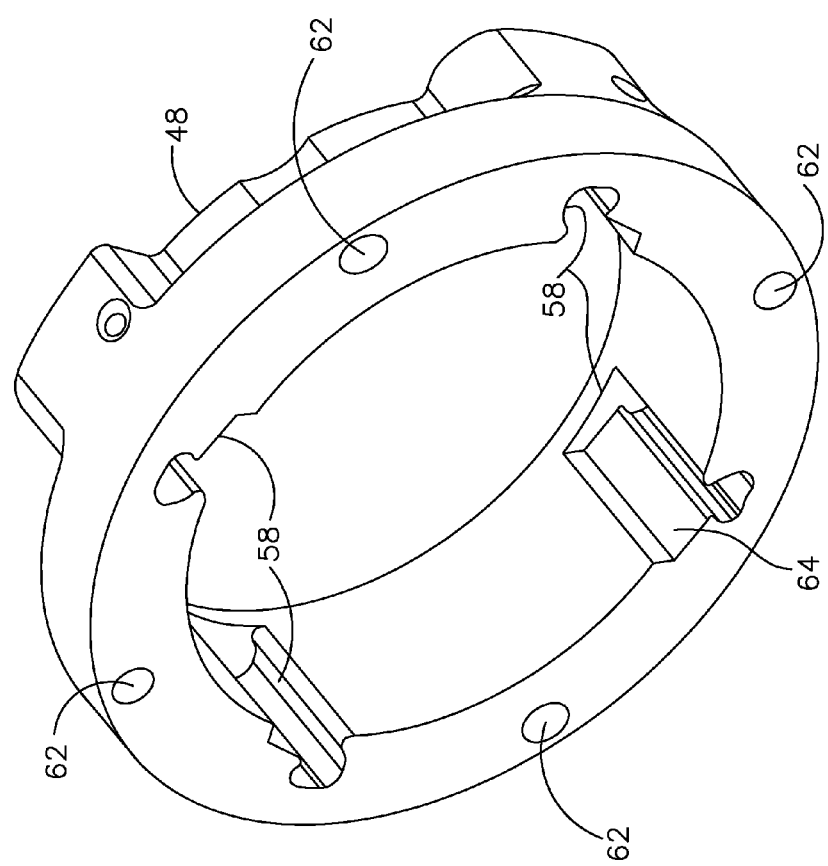
FIG. 6 is a perspective end view showing a permanent magnet fitted into one of the pockets of the outer race.

FIG. 6 shows a permanent magnet 64 fitted into one of the pockets 58 of the outer race 48.

Figure 7:
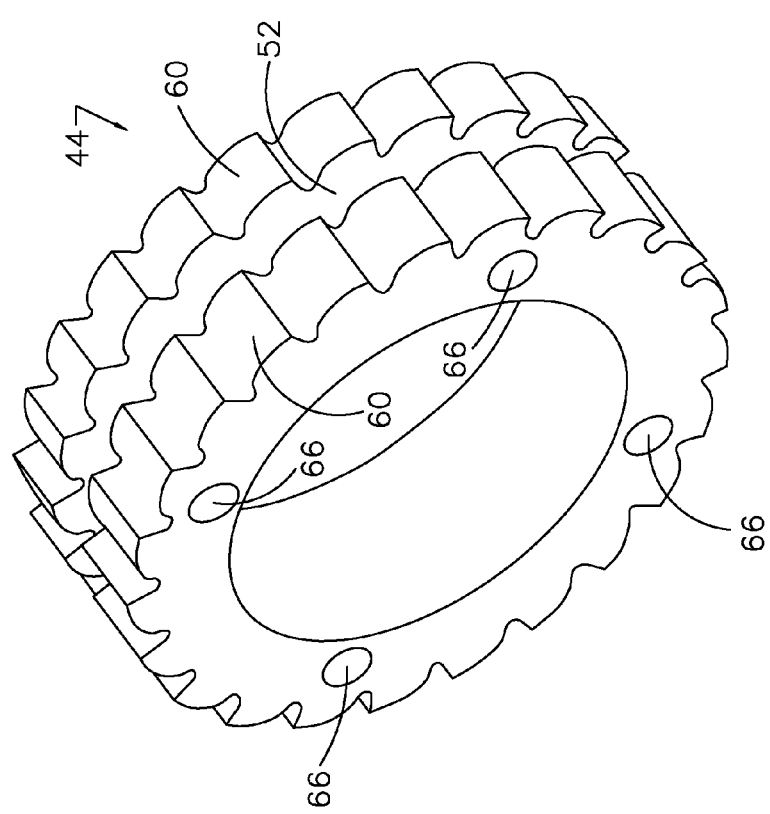
FIG. 7 is a perspective view of the inner race.

FIG. 7 shows the inner race 44 formed with a series of cams 60 on its outer radial surface, continuity of the cam surfaces being interrupted by the central, circular groove 52, which contains the coil 54. The inner race 44 is formed with four holes 66, by which the inner race is connected by bolts 46 to the housing 20.

Figure 8:
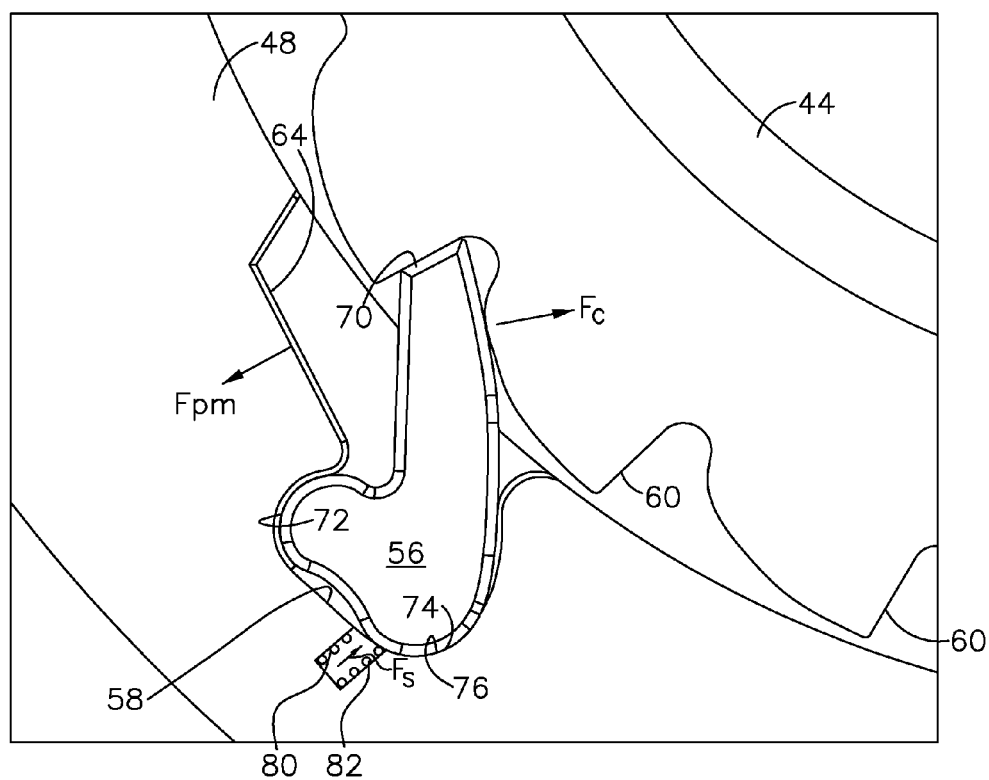
FIG. 8 is an end view showing a locking element engaged with a cam and forces operating on the strut.

As FIG. 8 illustrates, a force Fpm produced by the field of permanent magnet 64 on strut 56 is directed radially outward tending to move the strut 56 away from engagement with the cams 60. When outer race 48 is rotating, centrifugal force acting on strut 56 urges the strut toward and into engagement with the cams 60. When coil 54 is energized, its magnetic field induces a force Fc in the strut 56 urging the strut toward and into engagement with the cams 60.

When the strut 56 engages a cam, the strut pivots at its toe 72 such that the tip 70 of strut contacts the cam. A force between the locking face 70 and the cam 60 is reacted by contact between the strut's convex heel 74 and the mating concave surface 76 of the pocket 58.

A spring 80, such as coiled helical compression spring or an accordion compression spring, located in a recess 82 formed in the pocket plate 48, may be used to apply a force Fs to the heal 74 of strut 56 urging the strut toward and into engagement with the cams 60.

Figure 9:
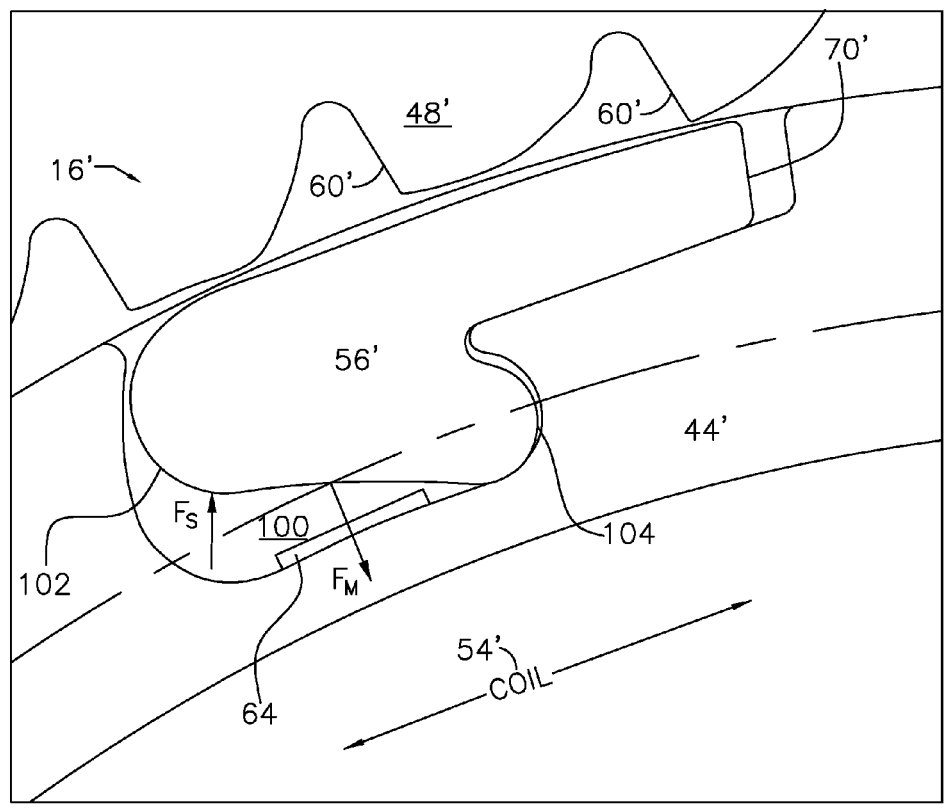
FIG. 9 is an end view of an alternate embodiment of the clutch.
Figure 10:
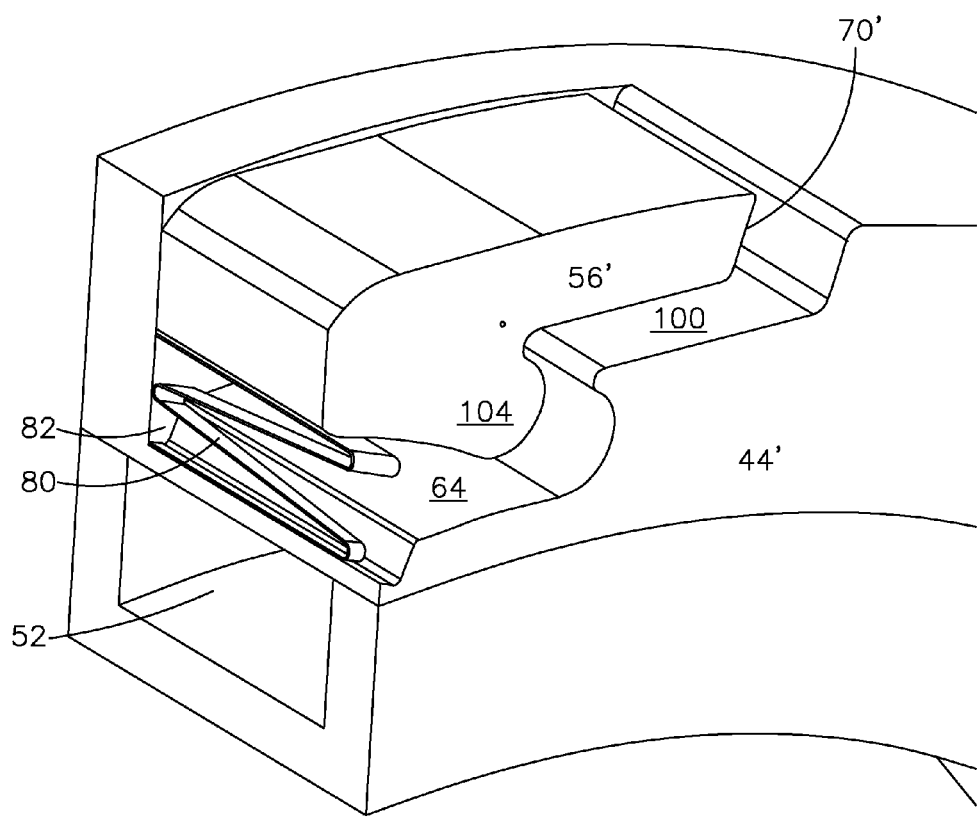
FIG. 10 is a perspective view of the embodiment of FIG. 10 showing an accordion spring contacting the strut.

FIGS. 9 and 10 show an alternate embodiment in which the inner race 44' is formed with pockets 100, each pocket containing a strut 56', and the circular groove 52 that contains the coil 54' is accessible from the radial inner surface of the race 44'. The radial inner surface of the outer race 48' is formed with cams 60'. When the coil 54' is energized, the heel 102 of strut 56' is pulled radially inward toward axis 18, strut 56' pivots on the toe 104, the locking face 70' of the strut engages one of the cams 60', and the clutch 16' engages, thereby locking the clutch and preventing the rotor 32 from rotating relative to the stator 26 and housing 20. In FIG. 9, Fs represents the force of spring 80 tending to move the strut 56' away from the cams 60', and Fm represents the force due to the permanent magnet 64 tending to move the strut into engagement with a cam.

FIG. 10 is a perspective view of the embodiment of FIG. 9 showing an accordion spring 80 located in the spring recess 82 and contacting the strut. The force applied by spring 80 urges strut 56' out of engagement with the cams 60'. Either springs 80 or permanent magnets 64 can be used to produce a force on the struts 56' in opposition to the force due to energizing electromagnetic coil 54'.

In operation, when the coil 54, 54' is energized with electric current while the rotor 32 and outer race 48 are rotating, the magnetic field induced by the current should be strong enough that, after the cams push the strut into the pocket, the strut is held in the pocket farthest away from the cams so that the clutch cannot lock. When the clutch must become locked, the coil 54, 54' is deenergized or, if necessary, is pulsed with a reversing current to degauss the system, allowing the spring 80 to push the strut into engagement with the cams 60.

Alternatively, the design of the clutch is such that the magnetic field induced by current in coil 54 causes the strut to pivot in the pocket, moving the strut into engagement with a cam, thereby locking the clutch.

Preferably the races 44, 44', 48, 48' are made from nonmagnetic magnetically permeable material, such as a suitable stainless steel or soft iron. Preferably the inner race 44, 44' is of soft iron. The struts 56, 56' are made preferably from a permeable material such as ferrous powder metal.

Preferably for one application, the permanent magnet material is Alnico 5, whose components include aluminum, nickel and cobalt. A commercial supplier of the permanent magnet material is Magnet Sales and Manufacturing Inc., Culver City, Calif. 90230. Preferably the windings have about 225 turns of 27 gauge copper wire. The current supplied to the windings is 1 amp. The rotor is non-magnetic. The permanent magnet material of the stator/strut is about 500 Webers. The field strength is about 5 amp-turns/meter.

In accordance with the provisions of the patent statutes, the preferred embodiment has been described. However, it should be noted that the alternate embodiments can be practiced otherwise than as specifically illustrated and described.

The invention claimed is:

1. A one-way clutch, comprising:
   a first race secured against rotation and fitted with a coil;
   a second race supported for rotation;
   struts supported on the second race, each strut driveably connecting and disconnecting the races in response to a magnetic field induced by current in the coil;
   pockets formed in the second race, each strut located in one of the pockets; and
   a permanent magnet located in each of the pockets.

2. The clutch of claim 1, wherein
   the first race is formed with cams; and
   the struts are supported on the second race to pivot into and out of engagement with at least one of the cams.

3. The clutch of claim 1, wherein:
   the first race is secured to a housing of a electric motor-generator; and
   the second race is secured to a rotor of the motor-generator.

4. The clutch of claim 1, wherein:
   the first race is secured to a stator of a electric motor-generator; and
   the second race is secured to a rotor of the motor-generator.

5. The clutch of claim 1, further comprising:
   a spring recess formed in the second race.

6. A one-way clutch, comprising:
   a nonrotatable race including cams and a coil;
   a rotatable race formed with pockets including struts that pivot into and out of engagement with the cams in response to a magnetic field induced by current in the coil, each strut located in one of the pockets;
   permanent magnets, each permanent magnet located in one of the pockets for urging one of the struts out of engagement with one of the cams.

7. The clutch of claim 6, wherein the rotatable race is located radially outward from and surrounding the nonrotatable race.

8. The clutch of claim 6, wherein:
   the nonrotatable race is secured to a stator of a electric motor-generator; and
   the rotatable race is secured to a rotor of the motor-generator.

9. The clutch of claim 6, further comprising:
a spring recess formed in the rotatable race; and
a spring located in each spring recess.

10. The clutch of claim 6, further comprising: a spring recess formed in the rotatable race.

11. A one-way clutch, comprising:
a rotatable race including cams;
a nonrotatable race formed with pockets, including a coil and struts that pivot into and out of engagement with the cams in response to a magnetic field induced by current in the coil, each strut located in one of the pockets; and
one of springs and permanent magnets, each spring or magnet urging one of the struts out of engagement with one of the cams.

12. The clutch of claim 11, wherein the rotatable race is located radially outward from and surrounding the nonrotatable race.

13. The clutch of claim 11, wherein:
the nonrotatable race is secured to a stator of a electric motor-generator; and
the rotatable race is secured to a rotor of the motor-generator.

14. The clutch of claim 11, further comprising:
a spring recess formed in the nonrotatable race; and
one of the springs located in each spring recess.

* * * * *